(12) United States Patent
Shin et al.

(10) Patent No.: US 7,519,282 B2
(45) Date of Patent: *Apr. 14, 2009

(54) OPTICAL IMAGE STABILIZER FOR CAMERA LENS ASSEMBLY

(75) Inventors: Jeong-Kil Shin, Suwon-si (KR); Doo-Sik Shin, Suwon-si (KR); Jong-Pil Lee, Cheongju-si (KR); Hee-Seung Kim, Seoul (KR); Jin-Soo Seol, Cheongju-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 326 days.

This patent is subject to a terminal disclaimer.

(21) Appl. No.: 11/272,346

(22) Filed: Nov. 10, 2005

(65) Prior Publication Data

US 2006/0269262 A1 Nov. 30, 2006

(30) Foreign Application Priority Data

May 26, 2005 (KR) ...................... 10-2005-0044544

(51) Int. Cl.
*G03B 17/00* (2006.01)
*H04N 5/228* (2006.01)

(52) U.S. Cl. ................ 396/55; 348/208.4; 348/E5.027; 348/E5.046

(58) Field of Classification Search .............. 396/55, 396/52, 54, 13; 348/E5.027, E5.046, 208.99, 348/208.2, 208.4, E5.031
See application file for complete search history.

(56) References Cited

U.S. PATENT DOCUMENTS

| | | | | |
|---|---|---|---|---|
| 5,153,633 A | * | 10/1992 | Otani | ........................ 396/55 |
| 5,717,960 A | * | 2/1998 | Tomita et al. | ................. 396/55 |
| 5,825,560 A | * | 10/1998 | Ogura et al. | ................ 359/822 |
| 6,064,827 A | * | 5/2000 | Toyoda | ........................ 396/55 |
| 6,415,105 B1 | * | 7/2002 | Sasaki et al. | ................. 396/55 |
| 2002/0112543 A1 | | 8/2002 | Noguchi | |
| 2008/0151063 A1 | * | 6/2008 | Mogamiya | ............... 348/208.2 |
| 2008/0225126 A1 | * | 9/2008 | Mogamiya | ............... 348/208.4 |

FOREIGN PATENT DOCUMENTS

| | | |
|---|---|---|
| DE | 4102196 A1 | 8/1991 |
| DE | 4342717 | 6/1994 |
| JP | 06-046314 | 2/1994 |
| JP | 08-211436 | 8/1996 |
| JP | 09-073111 | 3/1997 |
| JP | 09-244089 | 9/1997 |
| JP | 09-269520 | 10/1997 |
| JP | 11-064916 | 3/1999 |
| JP | 2002-196382 | 7/2002 |
| JP | 2003-110929 | 4/2003 |
| JP | 2003-167282 | 6/2003 |
| JP | 2005-102172 | 4/2005 |

* cited by examiner

*Primary Examiner*—Melissa J Koval
(74) *Attorney, Agent, or Firm*—Cha & Reiter, LLC

(57) ABSTRACT

An optical image stabilizer for a camera lens assembly, which includes: a main frame; a drive frame moving on the main frame in at least one direction; a camera element mounted to the drive frame; a pair of driving permanent magnets installed at one of the main frame and the drive frame; and a pair of coils installed at the other of the main frame and the drive frame and opposite to the driving permanent magnets, wherein the camera element is moved in its entirety via motion of the drive frame by interactions of the electromagnetic forces generated when currents are applied to the coils.

19 Claims, 5 Drawing Sheets

SECTION A-A'

SECTION B-B'

OPTICAL IMAGE STABILIZER FOR CAMERA LENS ASSEMBLY

CLAIM OF PRIORITY

This application claims priority to an application entitled "OPTICAL IMAGE STABILIZER FOR CAMERA LENS ASSEMBLY," filed with the Korean Intellectual Property Office on May 26, 2005 and assigned Ser. No. 2005-44544, the contents of which are incorporated herein by reference.

BACKGROUND OF THE INVENTION

1. Field of the Invention

The present invention relates to a camera lens assembly, and more particularly to an optical image stabilizer mounted to a digital camera or a mobile communication terminal for correcting an image blurred by a hand-shake of a user.

2. Description of the Related Art

A mobile communication terminal equipped with a camera function is being commonly used today.

Just as in a regular camera, images can be blurred using mobile communication terminals.

Although high resolution cameras are available with the progress of the optical technology, optical image stabilizers are needed to reduce the effect of image-blurs from vibrations.

Current technologies for correcting images is classified into two types. One is a DIS (digital image stabilization) or EIS (electronic image stabilization) method, which detects a hand-shake from a photographed image and corrects data stored in a camera device. More specifically, a blurred image is received, then by regulating positions and colors of the image with an electronic method or program, the blurred image can be adjusted.

The electronic image stabilization method has an advantage in that separate mechanical and physical constitutions are required, thus lowering the manufacturing cost. Also, the restriction on the structure is small, and thus can be easily employed. However, since it corrects an image through a software, it requires dedicated memory or a high efficiency camera device and takes longer to correct. Further, since there is a limit in removing an afterimage through a software, the correction rate is undesirably slow.

The other image stabilization technologies is an OIS (optical image stabilization) method, which corrects a shake of a subject image by detecting a hand-shake of a user and then changing the position of an optical lens or a camera device.

Since the OIS method needs a separate drive device, the manufacturing cost therefore increases and a separate installation space is needed. However, since a blur-free image is provided on the camera device, thereby removing an afterimage, the correction rate is over ninety percent. In addition, the OIS method can obtain an image more clearly than that of the EIS method. Therefore, the OIS device is more frequently used in a photography device requiring a high resolution.

Although the technology in which an optical lens is moved to correct an image in a digital camera having a space sufficient for embedding a drive section for driving the optical lens, it is difficult to employ such a technology in a miniaturized digital camera or a mobile communication terminal, which has many spatial restrictions. As a result, research efforts on a technology in which a hand-shake can be corrected by moving a camera lens is actively pursued.

Japanese Patent No. 10-39350 discloses an example of such an optical image stabilizer, which includes an X-axis piezoelectric device and a Y-axis piezoelectric device at the outer periphery of an optical lens, a separate portion for supporting them, whereby the optical lens makes contact to a drive shaft of the piezoelectric device to move the optical lens by a predetermined distance using a frictional force. However, since the outer diameter of the optical lens system increases to install the drive device such as the piezoelectric device at the outer periphery of the optical lens, it is difficult to mount the stabilizer to a mobile communication terminal having a restricted assembly length and diameter. Further, since a considerable drive force must be generated to drive the optical lens of a predetermined weight, there is a limit in miniaturizing the drive device. Lastly, since much electric power is needed, there is a limit in mounting the stabilizer to a portable photography device which uses charging batteries.

Hence, difficulties in designing a miniaturized drive device and the rise of manufacturing costs according to the increase in the number of parts are obstacles in securing the cost competitiveness of a photography device in which an image stabilizer is embedded. Moreover, in the case of a contact-type drive device which uses frictional forces with a drive shaft such as a piezoelectric device, it is difficult to manage the tolerance of the contact surfaces. In the event that the contact surface is worn, malfunction can be generated, thereby lowering the reliability. Furthermore, since a drive circuit for generating and applying a predetermined voltage wave is required to drive the drive device such as the piezoelectric device, the manufacturing cost increases, and there is a restriction in simplifying the photography device.

SUMMARY OF THE INVENTION

Accordingly, the present invention has been made to solve the above-mentioned problems occurring in the prior art and provides additional advantages, by providing an optical image stabilizer of a camera lens assembly which can be embedded in a miniaturized photography device, such as a micro-digital camera and a mobile communication terminal, and can obtain a clear image even when the camera is shaken during operation.

One aspect of the present invention is to provide an optical image stabilizer of a camera lens assembly in which a camera device is moved according to a hand-shake of a user by using coils and permanent magnets so that the structure thereof is simplified, the control thereof is easy, and the manufacturing cost thereof is reduced.

Another aspect of the present invention is to provide an optical image stabilizer of a camera lens assembly which can improve the reliability of the product by employing a non-contact driving method.

Further aspect of the present invention is to provide an optical image stabilizer of a camera lens assembly in which ball bearings are inserted between a fixed body and a drive body so that the movement of the drive body can be smoothly performed during the hand-shake correcting operation.

Yet another aspect of the present invention is to provide an optical image stabilizer of a camera lens assembly in which a drive body is movable in at least two directions during the hand-shake correcting operation, thereby improving the correcting operation.

In one embodiment, there is provided an optical image stabilizer for a camera lens assembly, which includes: a main frame; a drive frame moved on the main frame in at least one direction; a camera device mounted to the drive frame; a pair of driving permanent magnets installed in one of the main frame and the drive frame; and a pair of coils installed at the other of the main frame and the drive frame and opposite to the driving permanent magnets, wherein the drive frame is moved by interactions of the electromagnetic forces generated when currents are applied to the coils with the magnetic forces of the driving permanent magnets.

BRIEF DESCRIPTION OF THE DRAWINGS

The above features, and advantages of the present invention will be more apparent from the following detailed description taken in conjunction with the accompanying drawings, in which.

DETAILED DESCRIPTION

Figure 1:
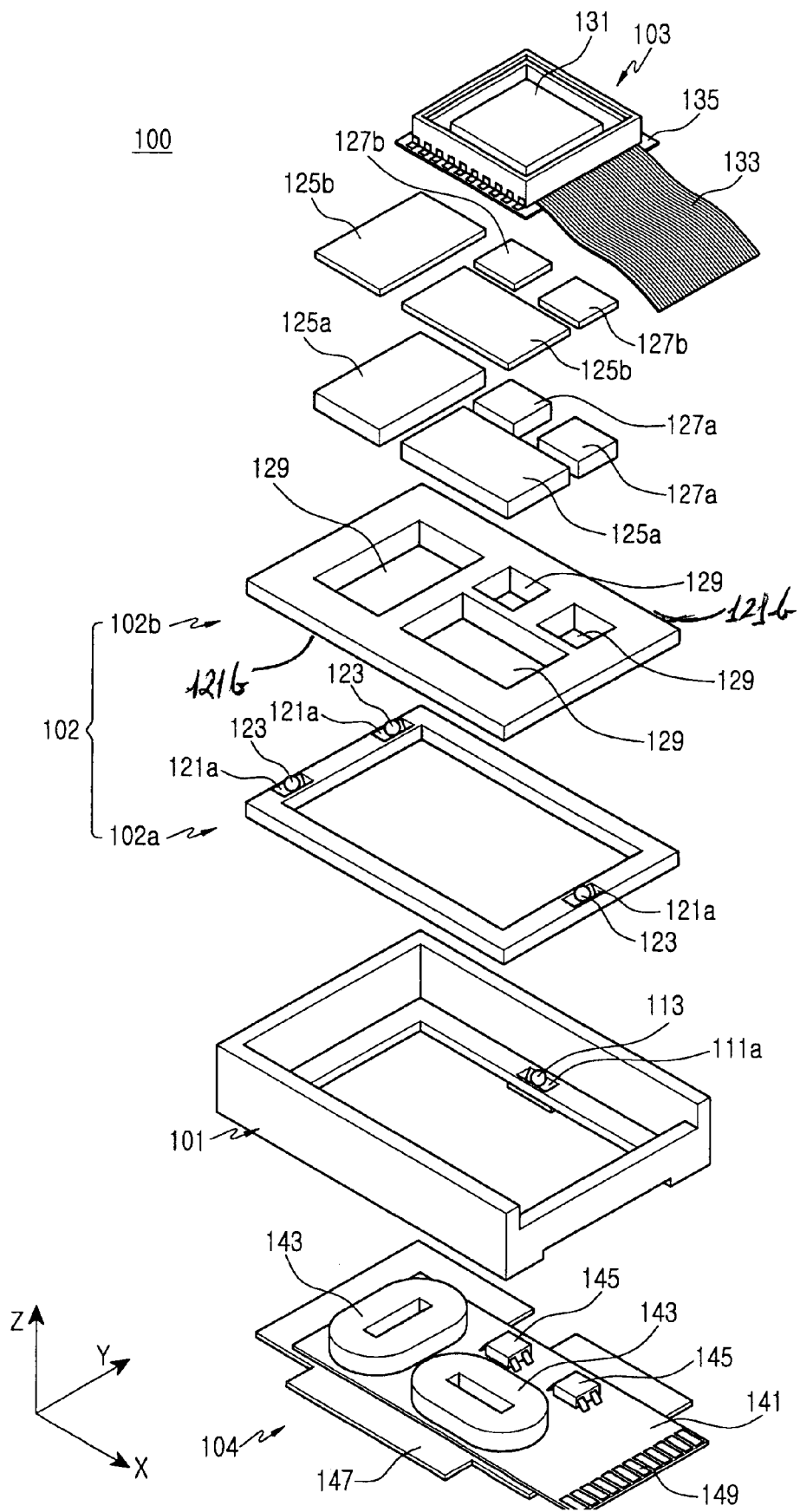
FIG. 1 is an exploded perspective view for showing an optical image stabilizer for a camera lens assembly according to an preferred embodiment of the present invention.
Figure 2:
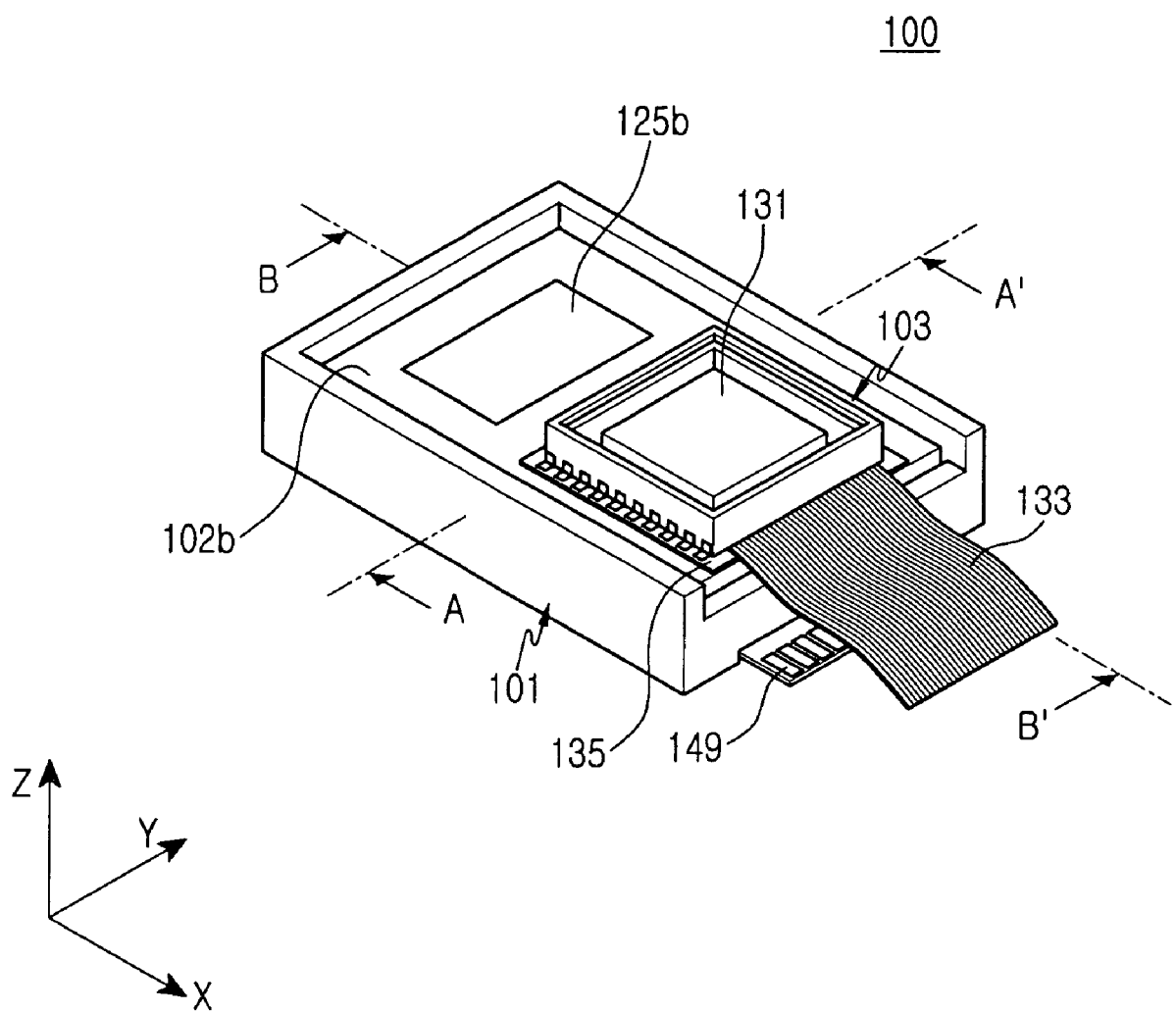
FIG. 2 is a perspective view for showing the assembled state of the optical image stabilizer shown in FIG. 1.

Hereinafter, embodiments of the present invention will be described with reference to the accompanying drawings. For the purposes of clarity and simplicity, a detailed description of known functions and configurations incorporated herein is omitted to avoid making the subject matter of the present invention unclear.

As shown in FIGS. 1, 2, 5, and 6, an optical image stabilizer 100 of a camera lens assembly according to the first preferred embodiment of the present invention includes a main frame 101, a drive frame 102, coils 143, and permanent magnets 125a. The optical image stabilizer 100 corrects image blurring arising from a hand-shake, by moving the drive frame 102 on the main frame 101 using interactions between the coils 143 and the permanent magnets 125a, thereby changing the position of a camera device 103.

A portion of the upper surface of the main frame 101 is opened so that a subject image can be introduced into a camera device 103. First slide recesses 111a opened towards a direction (Z-direction) in which the subject image is introduced are formed on the lower surface of the main frame 101. The first slide recesses 111a extend along a first direction (X-direction).

The lower surface of the main frame 101 is closed by a coil section 104. The coil section 104 includes a printed circuit board 141 in which a connector 149 is formed at one end thereof, a pair of coils 143 mounted onto the printed circuit board 141, and position detecting sensors 145 mounted onto the printed circuit board 141 for detecting the amount of movement of the drive frame 102. Generally, the coils 143 can be winding coils wound by a winding machine or can be laminated coils manufactured by using the MEMS (micro electro mechanical systems). A yoke 147 is mounted onto the lower surface of the printed circuit board 141.

The first and second frames 102a and 102b of the drive frame 102 which are stacked along the direction in which the subject image is introduced are surrounded by the mainframe 101.

Figure 3:
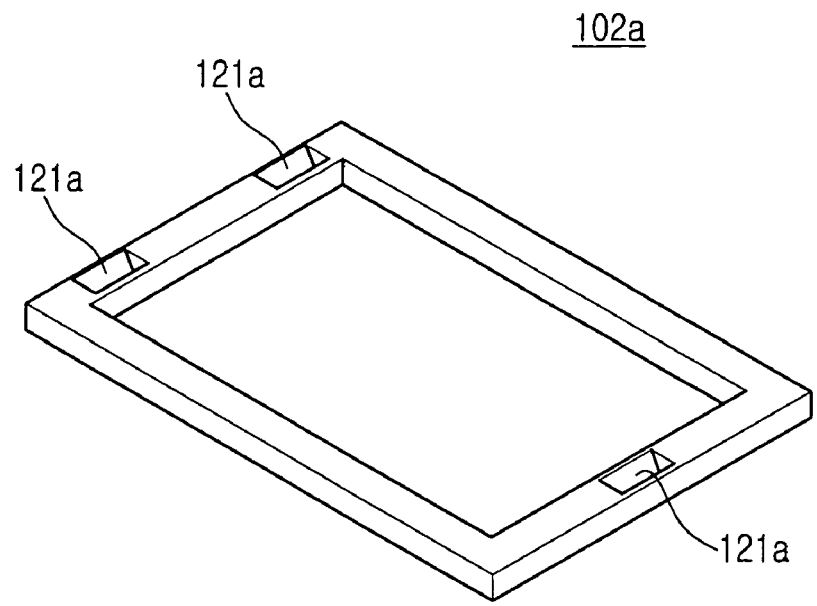
FIG. 3 is a top perspective view for showing a first frame of the optical image stabilizer shown in FIG. 1.
Figure 4:
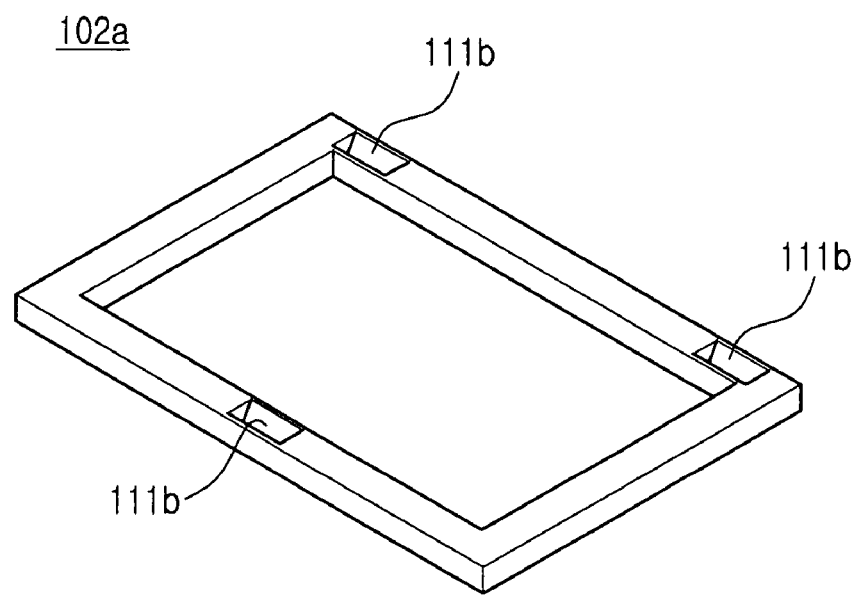
FIG. 4 is a bottom perspective view for showing the first frame of the optical image stabilizer shown in FIG. 1.
Figure 5:
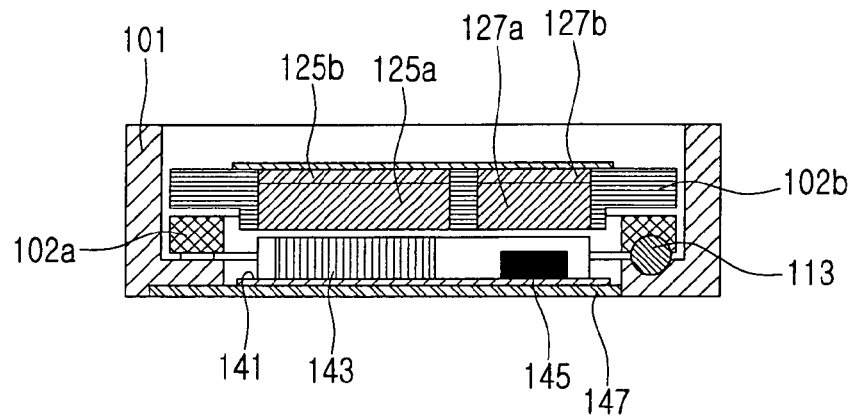
FIG. 5 is a cross-sectional view taken along line A-A' of FIG. 2 for showing the optical image stabilizer.
Figure 6:
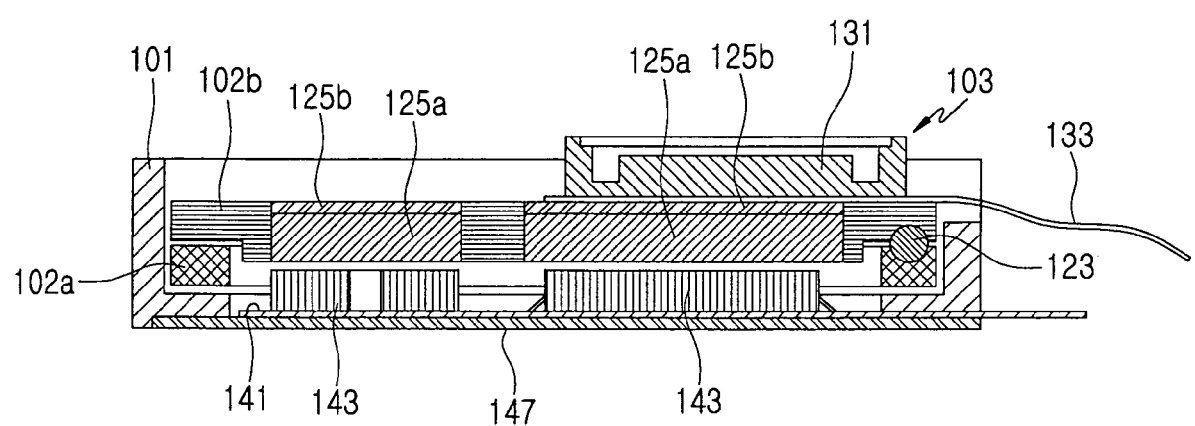
FIG. 6 is a cross-sectional view taken along line B-B' of FIG. 2 for showing the optical image stabilizer.

Referring to FIGS. 3 and 4, the first frame 102a includes second slide recesses 111b extending along the first direction (X-direction) on the lower surface thereof, and the second slide recesses 111b are located so as to be opposite to the first slide recesses 111a. Balls 113 are interposed between the main frame 101 and the first frame 102a, particularly between the first slide recesses 111a and the second slide recesses 111b. A portion of each ball 113 is received in the first slide recess 111a and another portion thereof is received in the second slide recess 111b, thereby separating the main frame 101 from the lower surface of the first frame 102a. As a result, the first frame 102a can move smoothly along the first direction (X-direction) without friction with the main frame 101 since the first and second slide recesses 111a and 111b extend along the first direction (X-direction). Note that first and second slide recesses 111a and 111b can have various shapes, and it is preferable that the cross-section of each recess have a V-shape. Further, in order to prevent the wear by frequent movements of the first frame 102a, it is preferable that the balls 113 and the portions with which the balls 113 make contact are made of a metal material.

The second frame 102b is stacked on the upper surface of the first frame 102a and moves in a second direction (Y-direction). Since the second frame 102b is stacked on the first frame 102a, it can be moved in the first direction (X-direction) with respect to the main frame 101, together with the first frame 102a. Further, the second frame 102b can be moved in the second direction (Y-direction) on the first frame 102a. Therefore, the second frame 102b can be moved in the first and second directions (X-direction and Y-direction) with respect to the main frame 101.

In the second frame 102b is installed a pair of driving permanent magnets 125a opposite to the pair of coils 143 respectively and permanent magnets 127a for sensor which are opposite to the position detecting sensors 145. Yokes 125b and 127b for forming magnetic paths are attached on the upper surfaces of the driving permanent magnets 125a and the permanent magnets 127a respectively, thereby effectively utilizing the magnetic forces of the permanent magnets 125a and 127a.

The magnetic forces of the driving permanent magnets 125 generates driving forces by which the second frame 102b is moved in the first and second directions (X-direction and Y-direction), by the interactions with the electromagnetic forces generated by the coils 143. By detecting the position changes of the permanent magnets 127a, the position detecting sensors 145 monitor the moved position of the second frame 102b.

At least one third slide recess 121a is formed on the upper surface of the first frame 102a and a fourth slide recess (not shown) is formed on the lower surface of the second frame 102b in such a manner that it is opposite to the third slide recess 121a, so that the second frame 102b smoothly moves along the second direction (Y-direction).

Balls 123 are interposed between the first frame 102a and the second frame 102b, particularly between the third and fourth slide recesses 121a and 121b, thereby enabling a smooth movement of the second frame 102b in the second direction (Y-direction). The combination of the third and fourth slide recesses 121a and 121b along with the balls constitutes a ball bearing. The ball bearing combination between the first and second frames 102a and 102b is equivalent to the ball bearing combination between the main frame 101 and the first frame 102a.

It is preferable that the numbers of the first, second, third, and fourth slide recesses 111a, 111b, 121a, and 121b are at least three respectively, so that the first and second frames 102*a* and 102*b* can be moved in one plane.

The camera device 103 is mounted onto the second frame 102*b*. The camera device 103 includes an image sensor 131 into which an image of a subject is inputted and a flexible printed circuit 133 transferring image signals inputted from the image sensor 131. The camera device 103 is supported by a substrate 135 and mounted onto the second frame 102*b*. Accordingly, the camera device 103 can be moved in the first and second directions (X-direction and Y-direction) with respect to the main frame 101 together with the second frame 102*b*.

The main frame 101 is mounted and fixed to a photography device. such as a digital camera and a mobile communication terminal. The position of the second frame 102*b*, particularly the position of the camera device 103, is changed by the interactions between the electromagnetic forces generated by the currents applied to the coils 143 according to the degree of a hand-shake and the magnetic forces formed by the driving permanent magnets 125*a*.

One of the coils 143 is installed in the first direction (X-direction) together with the driving permanent magnet 125*a* opposite thereto, and the other of the coils 143 is installed in the second direction (Y-direction) together with the driving permanent magnet opposite thereto. Thus, the electromagnetic forces generated by the currents applied to the coils 143 interacts with the magnetic forces of the driving permanent magnets 125*a* to move the second frame 102*b* in the first and second directions (X-direction and Y-direction).

In a state in which a current is not applied to the coils 143, attractive forces are applied between the driving permanent magnets 125*a* and the yoke of the coil section 104, so that the second frame 102*b* returns to an initial position set when it is initially assembled.

Further, the attractive forces between the driving permanent magnets 125*a* and the yoke 147 of the coil section 104 restricts the second frame 102*b* from moving in the third direction (Z-direction) along which the subject image is introduced. Therefore, the camera device 103 restricts the subject image from moving in the direction (Z-direction) where the subject image is introduced.

In case the magnetic forces of the driving permanent magnets 125*a* are so weak that the attractive forces generated between the driving permanent magnets 125*a* and the yoke 147 of the coil section 104 are too weak to prevent the movement of the second frame 102*b* in the third direction (Z-direction), a separate resilient member (not shown) such as a spring can be installed to serve the same purpose. The resilient member can be installed between the main frame 101 and the driving frame 102 to restrict the movement of the second frame 102*b* along the third direction (Z-direction).

The yokes 125*b* attached to the upper surfaces of the driving permanent magnets 125*a* and the yoke 147 of the coil section 104 form a magnetic field shielding structure in which they induce a magnetic field so that the magnetic forces of the driving permanent magnets 125*a* are effectively applied, thereby restricting discharge of the magnetic forces to the outside. The yokes thus restrict magnetic forces of the driving permanent magnets 125*a* from affecting the peripheral circuit devices etc.

The position detecting sensors 145 are provided to trace the moved position of the second frame 102*b*, and it is preferable that they are separated from the coils 143 by predetermined distances so as not to be affected by the electromagnetic forces generated in the coils 143. The position detecting sensor 145 can include an optical sensor, a hall sensor, etc. The optical sensor can detect a fixed density but is not cost efficient. The sensitiveness of the hall sensor is lower than the optical sensor, but the hall sensor has an advantage in that the cost is low and has a sensitiveness suitable for correcting image blurring due to a hand-shake. In the embodiment, the position detecting sensors 145 include a pair of hall sensors, and the permanent magnets 127*a* are mounted to the second frame 102*b* to detect the change of the position of the second frame 102*b*.

Since almost all the photography devices including the optical image stabilizers use charging batteries, ND-type permanent magnets having large intensities are used to reduce the power consumed in the optical image stabilizers. In the case that permanent magnets of large magnetic forces are used, since the reacting speed or correcting speed of the driving frame 102 can be disadvantageously lowered due to excessive attractive forces between the yoke 147 of the coil section 104 and the permanent magnets 125*a* on the second frame 102*b*, it is preferable that the intensities of the permanent magnets are set by considering the attractive forces due to the magnetic forces, the weight of the drive frame, and the frictional force during the movement of hand-shake.

Further, the initial stop position of the camera device 103 can be maintained more accurately by disposing a yoke having a permeability or a separate permanent magnet on one side of the main frame 101 and using attractive forces or repulsive forces of the permanent magnets 125*a* of the second frame 102*b*. Therefore, the position control algorithm of the second frame 102*b* can be easily realized, thereby improving the correction speed.

The yokes 125*b* and 127*b* attached to the upper surface of the permanent magnets 125*a* and 127*a* to form magnetic paths of magnetic poles to reduce the magnetic resistances of the magnetic fluxes generated in the permanent magnets 125*a* and 127*a* and increases the intensities of the magnetic forces supplied to the coils 143. It is preferable that the yokes 125*b* and 127*b* are made of a metal material with high permeability. Further, the yokes 125*b* and 127*b* can be separated or stacked according to the positions of the permanent magnets 125*a* and 127*a*, or can be integrally formed.

The image sensor 131 is a photoelectric transducer in which the subject image is introduced thereinto and can process the image information, such as the color and brightness of the subject image digitally, and can include a CCD sensor, a CMOS sensor, etc. The image sensor 131 is mounted on the upper end of the second frame so as to be exposed to the outside. Therefore, the blur in the second direction (Y-direction) is corrected by the movement of the second frame 102*b* and the blur in the first direction (X-direction) is corrected by the movement of the first frame 102*a*, thus providing a clear image.

Figure 7:
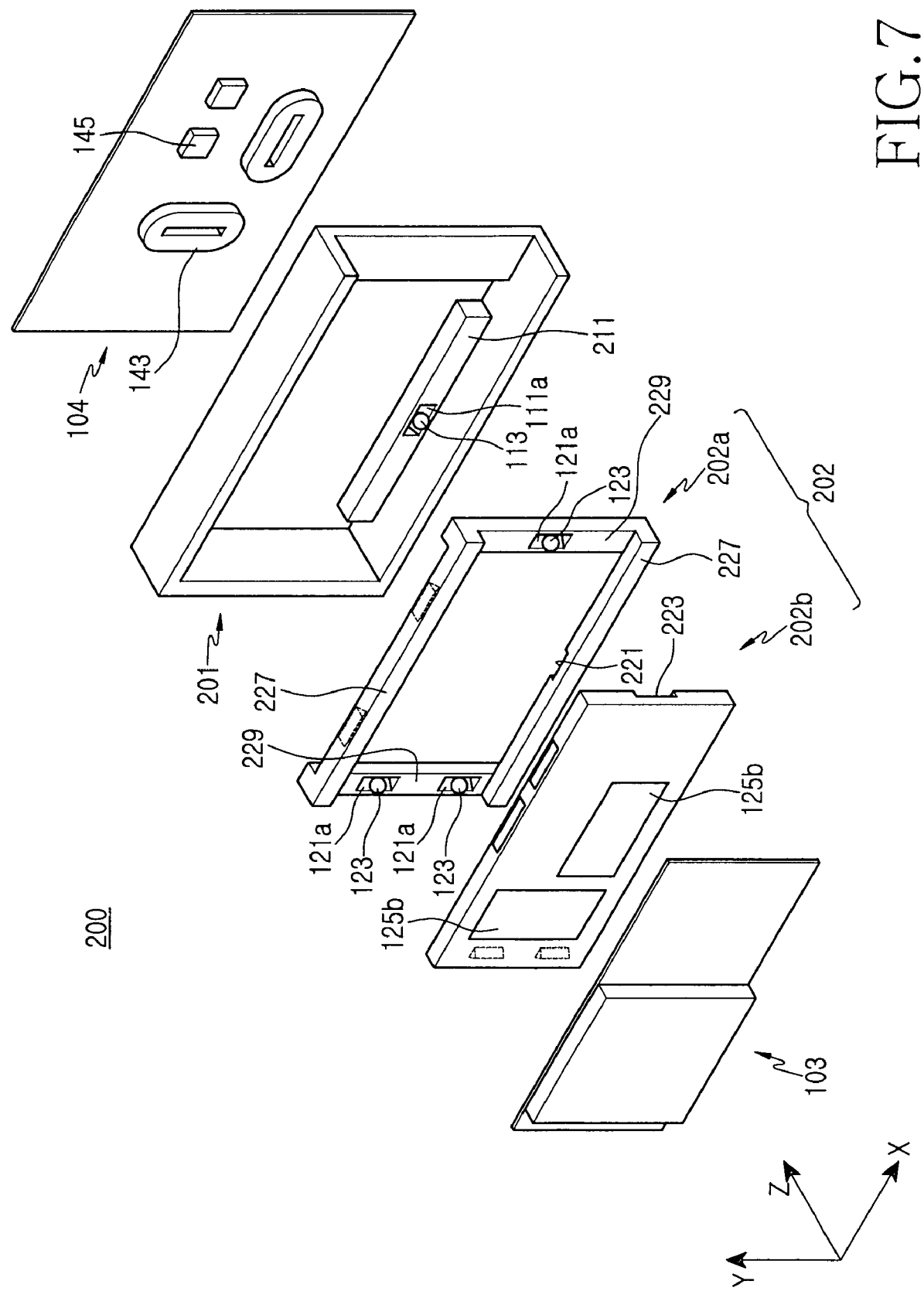
FIG. 7 is an exploded perspective view for showing an optical image stabilizer for a camera lens assembly according to another embodiment of the present invention.

FIG. 7 shows an optical image stabilizer for a camera lens assembly according to the second preferred embodiment of the present invention. The optical image stabilizer for a camera lens assembly according to the second preferred embodiment of the present invention is different from the proceeding embodiment in the structures of the first and second frames 202*a* and 202*b*. Therefore, it should be noted that the same reference numerals are used, and to avoid redundancy some reference numerals are omitted with respect to the elements which can be easily understood with respect to the first embodiment.

The optical image stabilizer 200 according to the second preferred embodiment of the present invention is different from the first embodiment in that the thickness thereof is reduced. Further, since some of the slide recesses 221 and 223 are formed so as to be of planar-type, the first and second frames 202*a* and 202*b* can be moved more smoothly.

In the first embodiment, in forming the first to fourth slide recesses 111a, 111b, and 121a, the second and third slide recesses 111b and 121a are positioned at a similar height. Namely, three layers are stacked. However, in the second embodiment of the present invention, the shape of the first frame 202b is modified so that the third slide recesses 121a are located with the first slide recesses 111a on the same plane, and the forth slide recesses 223 are located with the second slide recesses 221 on the same plane. Therefore, according to the second embodiment of the present invention, the position relations of the slide recesses alone is taken into consideration when two layers are stacked.

More particularly, support ribs 211 are formed at inner side surfaces of the main frame 201, which the inner side surfaces are formed along the first direction (X-direction) respectively and face each other. The support ribs 211 extend in the first direction (X-direction), and both ends thereof are separated from inner side walls being formed along the second direction (Y-direction), respectively. The first frame 202a includes a pair of first support members 227 extending in parallel to each other in the first direction (X-direction) and a pair of second support members 229 extending in parallel to each other in the second direction (Y-direction). Both ends of the second support members 299 are coupled to both ends of the first support members 227, respectively. If the first frame is positioned on the main frame 201, the lower surfaces of the first support members 227 are positioned on the support ribs 211 of the main frame 20,1 respectively. Thus, both ends of the second support members 229 are located between the ends of the support ribs 211 and the inner side walls of the main frame 201 which moves in the second direction (Y-direction), respectively. Therefore, the second support members 229 and the support ribs 211 are located in the same plane.

As the first slide recesses 111a are formed in the support ribs 211 respectively and the third slide recesses 121a are formed in the second support members 229 respectively, the first and third slide recesses 111a and 121a are located in the same plane.

If the second frame 202b is located on the first frame 202a, both side surfaces thereof are surrounded by the first support members 227. As a result, compared with the first embodiment, the thickness of the optical image stabilizer according to the second embodiment of the present invention is determined by the thicknesses of the support ribs 211 of the main frame 201 and the second frame 202b.

The first to fourth slide recesses 111a, 221, 121a, and 223 comprise three recesses respectively, and some of the second and fourth slide recesses 221 and 223 can be of planar-type.

As an example, a pair of the recesses of the first slide recesses 111a are located on one side of the main frame 101 and one of the recesses of the first slide recesses 111a on the other side thereof. Then, those formed on one side of the main frame 101 are located in one line, and that formed on the other side thereof is formed in parallel to those formed on one side thereof. The second slide recesses 221 correspond to the first slide recesses 111a, and the description thereof is omitted. Then, if the recesses formed at one side of the main frame 101 and the recess at the other side are not perfectly parallel or the second slide recesses 221 does not conform to the first slide recesses 111a, the movement of the first frame 292a is not smooth. Moreover, if all of the first and second slide recesses 111a and 221 have a V-shape, the first frame cannot smoothly move. Therefore, by forming the second slide recess 221 at the other side so as to be a planar-type, even if the parallelism between the slide recesses is not ideal or the slide recesses formed in the main frame 101 and the first frame 202a do not conform to each other, the first frame 202a can be smoothly moved.

The optical image stabilizers 100 and 200 according to the embodiments of the present invention can change the position of a camera device in two directions (X-direction and Y-direction) perpendicular to each other. The driving forces changing the position of the camera device are formed by the interactions between the electromagnetic forces generated when a current is applied to the coils causing magnetic forces around the permanent magnets. The movement range of the camera device on the optical image stabilizers 100 and 200 is restricted to several tens or several hundreds micrometers. Thus, it is possible to correct the blur of the image by moving the camera device in a range of several tens or several hundreds micrometers.

As mentioned above, since the optical image stabilizers according to the embodiments of the present invention can change the position of the camera device by using a pair of coils and permanent magnets, they are more advantageous in miniaturization than the conventional technology which corrects image-blur by moving a lens system. Therefore, they can be mounted to a miniaturized photography device such as a micro-digital camera, a mobile communication device, etc., to obtain a clear image. Further, since the camera device is driven according to a hand-shake of a user by using the coils and permanent magnets, the structure of the optical image stabilizer is simplified, the control thereof is easy, and the manufacturing cost thereof is reduced.

In addition, by employing a non-contact driving method using not a piezoelectric device but the coils and the magnets, the reliability of the product is improved. Moreover, by inserting ball bearings between a fixed body, i.e., the main frame and a drive body, i.e., the drive frame, the drive body can be smoothly moved. Furthermore, since the drive body can be moved in at least two directions easily, the correcting operation improves.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical image stabilizer for a camera lens assembly, comprising:
   a main frame;
   a drive frame slidably movable on the main frame in at least one direction, wherein said drive frame and main frame contain corresponding recesses in which at least one ball bearing is interposed between the main frame and the drive frame, said recesses not conforming to each other;
   a camera element mounted to the drive frame;
   a pair of driving permanent magnets installed at one end of the main frame and the drive frame; and
   a pair of coils installed at other end of the main frame and the drive frame facing the driving permanent magnets,
   wherein the camera element is moved in its entirety via motion of the drive frame by interactions of electromagnetic forces generated when a current is applied to the coils.

2. The optical image stabilizer according to claim 1, further comprising a yoke installed at the other end of the main frame and the drive frame.

3. The optical image stabilizer according to claim 1, further comprising yokes surrounding the coils and the driving permanent magnets to form a magnetic field shielding structure against an exterior magnetic field.

4. The optical image stabilizer according to claim 1, further comprising:
at least one permanent magnet installed at one end of the main frame and the drive frame; and
at least one position detecting sensor installed at one end of the main frame and the drive frame facing the permanent magnet for sensor,
wherein the position detecting sensor detects the movement of the driving frame according to changes of magnetic forces generated from the permanent magnet.

5. The optical image stabilizer according to claim 1, wherein one of the coils is installed along a first direction together with the corresponding driving permanent magnet opposite to the coil, the other of the coils is installed along a second direction together with the corresponding driving permanent magnet opposite to the coil, wherein the second frame is moved in the first or second direction according to the coil to which a current is applied.

6. The optical image stabilizer according to claim 1, wherein the drive frame comprises:
a first frame installed on the main frame so as to be movable in a first direction with respect to the main frame; and
a second frame installed on the first frame so as to be movable in the first direction together with the first frame and to be movable in a second direction with respect to the main frame.

7. The optical image stabilizer according to claim 6, wherein the second direction is perpendicular to the first direction.

8. The optical image stabilizer according to claim 6, further comprising:
at least one first sliding recess formed in the main frame along one of the first and second directions and opposite to the first frame;
a second slide recess formed in the first frame along one of the first and second directions and opposite to the first slide recess; and
a ball bearing having a portion received in the first slide recess and another portion received in the second slide recess so that the main frame is separated from the first frame,
wherein the first frame is moved on the main frame in the direction along which the first and second slide recesses extend.

9. The optical image stabilizer according to claim 6, further comprising at least one ball bearing interposed between the first frame and the second frame.

10. The optical image stabilizer according to claim 9, wherein the drive frame comprises:
at least one third sliding recess formed in the first frame along one of the first and second directions and opposite to the second frame;
a fourth slide recess formed in the second frame along one of the first and second directions and opposite to the third slide recess; and
a ball bearing having a portion received in the third slide recess and another portion received in the fourth slide recess so that the second frame is separated from the first frame, and
wherein the second frame is moved on the first frame in the direction along which the third and fourth recesses extend.

11. The optical image stabilizer according to claim 6, further comprising:
at least one permanent magnet installed in one of the main frame and the second frame; and
at least one position detecting sensor installed in one of the main frame and the second frame and opposite to the permanent magnet for sensor,
wherein the position detecting sensor detects the movement of the second frame according to changes of magnetic forces generated from the permanent magnet for sensor.

12. The optical image stabilizer according to claim 11, wherein the position detecting sensor is a hall sensor.

13. The optical image stabilizer according to claim 6, wherein the permanent magnets are installed at one end of the main frame and the second frame of the drive frame and the coils are installed at the other end of main frame and the second frame of the drive frame.

14. The optical image stabilizer according to claim 6, further comprising:
at least one first sliding recess formed in the main frame along one of the first and second directions and opposite to the first frame;
a second slide recess formed on one surface of the first frame along one of the first and second directions and opposite to the first slide recess;
at least one third sliding recess formed on the other surface of the first frame along one of the first and second directions and opposite to the second frame;
a fourth slide recess formed in the second frame along one of the first and second directions and opposite to the third slide recess; and
balls interposed between the first slide recess and the second slide recess and between the third slide recess and the fourth slide recess so that the first frame is separated from the main frame and the second frame is separated from the first frame, respectively, and
wherein the first frame is moved on the main frame in the direction along which the first and second recesses extend and the second frame is moved on the first frame in the direction along which the third and fourth recesses extend.

15. The optical image stabilizer according to claim 14, wherein the third slide recess is formed in a same plane as the first slide recess and the fourth slide recess is formed in a same plane as the second slide recess.

16. The optical image stabilizer according to claim 6, further comprising support ribs respectively formed on inner side walls of the main frame which follow the first direction, wherein the support ribs extend along the first direction.

17. The optical image stabilizer according to claim 6, wherein the first frame comprises first support members extending in parallel to each other along the first direction and second support members extending in parallel to each other along the second direction and having ends combined with both ends of the first support members respectively, and when the second frame is located on the first frame, the first support members surround both side surfaces of the second frame.

18. The optical image stabilizer according to claim 6, further comprising support ribs formed on inner side walls of the main frame which follow the first direction,
wherein the support ribs extend along the first direction respectively, both ends of the support ribs are separated from inner side walls of the main frame which follow the second direction so as to form a predetermined space, and the first frame comprises first support members extending along the first direction parallel to each other and second support members extending along the second direction parallel to each other and having ends located in the space between the ends of the support ribs and the inner side walls of the main frame.

19. The optical image stabilizer according to claim 18, further comprising:
at least one first slide recess formed in the support ribs along the first direction; and at least one third slide recess formed in the second support members along the second direction, wherein the first and third slide recesses are located in a same plane.

* * * * *